(12) United States Patent
Bennatt

(10) Patent No.: US 8,641,894 B1
(45) Date of Patent: Feb. 4, 2014

(54) MINI METERING AND BIOLOGICAL BALANCER CONTROL STATION

(76) Inventor: Ted Arthur Bennatt, Spring, TX (US)

( * ) Notice: Subject to any disclaimer, the term of this patent is extended or adjusted under 35 U.S.C. 154(b) by 1063 days.

(21) Appl. No.: 11/974,890

(22) Filed: Oct. 16, 2007

Related U.S. Application Data

(60) Provisional application No. 60/852,096, filed on Oct. 16, 2006.

(51) Int. Cl.
*C02F 3/06* (2006.01)
*B01D 35/02* (2006.01)

(52) U.S. Cl.
USPC .................. 210/170.08; 210/532.2; 417/54; 417/90; 417/108; 417/109; 417/116

(58) Field of Classification Search
USPC ......... 417/54, 90, 108, 109, 116; 210/170.08, 210/532.2
See application file for complete search history.

(56) References Cited

U.S. PATENT DOCUMENTS

| 5,985,139 | A | 11/1999 | Zoeller |
| 6,162,020 | A | 12/2000 | Kondo |
| 6,383,369 | B2* | 5/2002 | Elston ............................ 210/86 |
| 7,022,237 | B2 | 4/2006 | Couch |
| 2002/0070163 | A1* | 6/2002 | Lambert ........................ 210/617 |
| 2006/0226071 | A1* | 10/2006 | Allen et al. ................... 210/620 |

* cited by examiner

*Primary Examiner* — Duane Smith
*Assistant Examiner* — Paul J Durand
(74) *Attorney, Agent, or Firm* — Jeffrey L. Wendt

(57) ABSTRACT

A Water and Wastewater Treatment Aerated Mini-Dosing air-lift pump System and filter housing, that replaces the conventional dosing pump, controls and additional Tank. It is adaptable to all access ports and uniquely smaller than a 3" inspection port and is integrally positioned in an existing or new raw water pretreatment or pump tank. It aerates the source pool thereby mitigating: $H_2SO_4$ gases, odors and source pool $BOD_5$. The system communicates with an above ground aerator and optional controls and in it's plurality supplies dissolved and free oxygen to the pump, housing, effluent and the source pool, with surge protection and scum mitigation. Mini-metering and, low pressure, extended cycle durations increase the average microbial production balance and microbial Ratio to nutrients BOD. The raw sewage tank no longer requires gas removal prior to inspection due to oxic and anoxic microbial processes that mitigates $H_2SO_4$ gases.

13 Claims, 3 Drawing Sheets

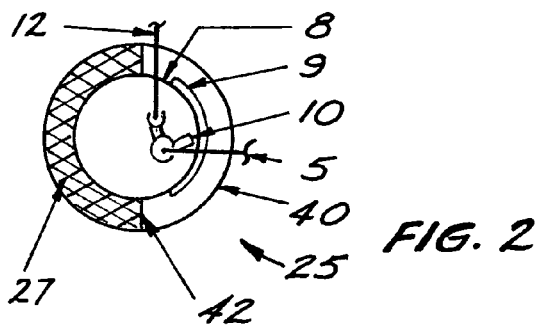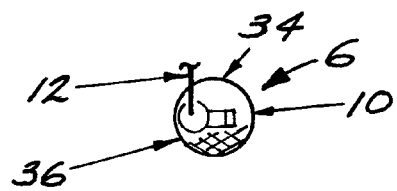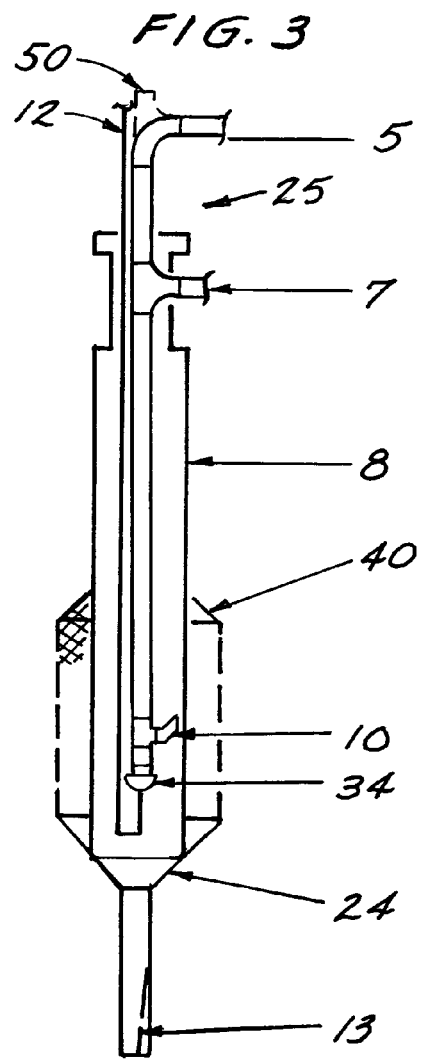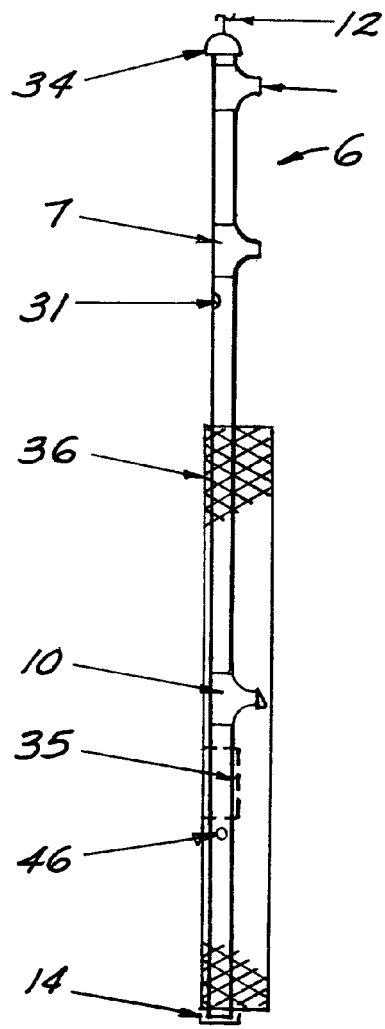

MINI METERING AND BIOLOGICAL BALANCER CONTROL STATION

CROSS-REFERENCE TO RELATED APPLICATIONS

I claim provisional application filed Oct. 17, 2007 filed as provisional application No. 60/852,096.

BACKGROUND OF THE INVENTION

Field of the Invention

The biological Mini Dosing Station is new to the Sewage treatment industry. The raw sewage pretreatment separation tank of the Host System is modified to accommodate a small, efficient, pneumatic pump. The raw sewage Host tank Separates: floating material, heavy solids, and liquids by gravity. The miniature air pump removes a preset volume of the sewage liquids to mitigate surge flows, BOD5 surges in the Host remote processes and also recirculates to mitigate scum and further the BOD reduction in the immediate source pool. The raw sewage treatment tank is converted to a low flow dosing station and together maintains separation processes during extended low flow aeration of the source pool and the effluent fluids that cultivate biological balance in the Host remote system.

Mini Metering and Biological Balance Control Station Background Art

U.S. Pat. No. 6,162,020 issued 19 Dec. 2000, which is assigned to NCA2BioProcess, Inc., discloses an earlier version of an air-lift pump unit for incorporation of general usage and also in an aerobic sewage treatment system. This invention is placed into service after sewage pretreatment and utilizes a custom pump tank. It discloses the most efficient airlift feed forward pump statistics.

U.S. Pat. No. 5,985,139 issued 16 Nov. 1999, which is assigned to Zoeller company, discloses an earlier version of a non aerating, portable, reciprocating septic pump and control station with a filter housing. This high velocity unit communicates with on demand pump start/stop switches to a leach field or further treatment. This unit is placed in service after raw sewage pretreatment and mounted in a pump tank.

SUMMARY OF THE INVENTION

The miniature dosing system provided by this invention facilitates: separation, oxidation mixing and feed forward extended duration dosing cycles in approved existing and new raw sewage, septic and aerobic systems. The main objective is dosing with an aeration pump. A further objective is to recirculate aerated effluent back into the source pool to seed aerobic and facultative processes and mitigate scum. Another objective is to implement selected adaptable filters in and around a filter housing similar to U.S. Pat. No. 5,985,139.

A further objective is to set the dosing volume and duration above ground, without a control panel, by positioning the air conduit's vertical depth in the pump's vertical mixing chamber and positioning the effluent line for optimum performance usually measured in Gallons Per Minute, GPM. The system is in communication with an above ground aerator and adjustable controls.

A further objective is to position the air pump inlet and filter housing inlet in the center strata between the floatable scum and the heavier solids, geometrically near the pretreatment effluent, thereby facilitating access to the horizontal strata of partially treated fluids being aerated by recirculation and filter cleaning.

Another objective is to mitigate Surge flows that transfer solids and undesirable bacteria downstream to other processes by lowering the pretreatment tank volume proportional to a preset pump cycle volume.

Another objective provides low pressure air pump extended duration cycles by mini-dosing to remote Host systems. Miniature dosing facilitates the remote processes to settle out solids at a rate greater than the dosing cycle thereby maintaining an increased average BOD5 capability. Miniature dosing eliminates the standard feast and famine feed cycles of high velocity centrifugal pumps by balancing the timely beneficial microbial to nutrient ratio.

Alternative sizing and positioning by skilled wastewater servicemen provides a balanced process of residential, commercial and industrial fluids.

The industry standards have incorporated additional septic separation tanks due to the infiltration of solids to the treatment areas. In septic systems the solids clog the leach field and shorten the life of the entire system. The additional septic settling tank and pump tank facilitates an improved scum and solids removal. A few counties require small homes to utilize one, raw sewage, pretreatment tank and one, gravity flow, septic separation tank. If the design requires dosing the leach field then an additional pump tank is required. This type pump tank is demonstrated without the built in vertical effluent pipes, as illustrated by U.S. Pat. No. 6,162,020 and U.S. Pat. No. 5,985,139. Pump tanks are constructed with an inlet and no outlet. The outlet is achieved by pump action and adding an effluent conduit through the access port. The novel objective was to make one pump compatible with all three types of tanks and with the dirtiest service.

Disclosed in U.S. Pat. No. 5,985,139 is an occasional backwash of non aerated fluids and no means to produce activated liquids or produce return activated liquids. Further disclosed are paralleled start/stop switches demonstrating a design for dirty service equipment failure and short cycle on demand high velocity pump action. Local control panels are required in this type service.

Disclosed in U.S. Pat. No. 6,162,020 is a bottom feed air pump in a custom tank arrangement. It is a novel efficient pump due to the inlet air to fluid mixing chamber. This configuration does not permit the standard belching used to clean the Mini Metering System (MMS) filter or aerate the source pool. Bottom inlet pumps requires the settling sludge to be separated prior to the fluids entering this pump tank.

Disclosed in US PGPUB 2002/0070163 is a biofilm fluidized bed reactor. Disclosed are two tanks with the first tank consisting of a raw sewage septic tank with an inlet and an outlet. The outlet is connected to a pump tank containing the invention. This invention is similar in function and not similar in components. A very similar MMS combustion stoichiometry exists in the raw sewage tank. The raw sewage enters the sewage tank 26, FIG. 1 influent conduit 18, FIG. 1 and deposits the floatable materials into a swirling circle of influent currents in the tee 17, FIG. 1. The fluids and the suspended solids travel down the vertical inlet conduit 19, FIG. 1 and immediately disperse slowly in the massive volume of the settling strata between the bottom of the vertical influent conduit 19, FIG. 1 and the tank 26, FIG. 1 bottom. The quantity of influent to the raw sewage treatment tank 26, FIG. 1 determines the amount of turbulence and distance the fluids and suspended solids will travel. During this period the aerated fluids of the upper strata will mix with the fresh influent and absorb the excess $O_2$ thereby beginning the first stage of carbonaceous BOD5 reduction and solids removal. Swirling oxygenated solids settle to the bottom in a few minutes. Fluids entering vertical inlet conduit 19, FIG. 1, will have residual oxygen and help maintain a facultative state and help dissolve the floatable material in the tee 17, FIG. 1. The partially dissolved particulate matter will now entrain, due to a large influent, and enter the system. Light particles float to the top and suspended solids begin the aerobic and facultative treatment. Two gallons will release a portion of the matter swirling in the tee 17, FIG. 1, and will not disturb the bottom sludge. The airlift pump 6, FIG. 1 at the beginning of the dosing cycle promotes large quantities of oxygen to clean the filter. The raw sewage tank 26, FIG. 1 volume is at the bottom of the offset 21, FIG. 1 at the time the user begins the usage cycle. The Return Activated Sludge (RAS) has been running continuously, therefore the upper to mid strata fluids are activated with oxygen and beneficial bacteria. The user's fresh influent disturbs the fresh sludge on top of the old sludge bed and a portion of the fresh sludge rises and moves slightly allowing oxygen to mix with the fresh sludge. Before the user cycle and during the user cycle oxidation occurs in the upper half of the tank volume. During the oxidation cycle biological oxidation and mixing occurs, with excess $O_2$, in the source pool stimulating the *Nitrosomonas* sp. thereby oxidizing the ammonia nitrogen ($N/NH_3$) to nitrite nitrogen ($N/NO_2$). The oxidative cycle together with *Nitrobactor* sp. continues to further convert nitrite nitrogen ($N/NO_2$) to nitrate nitrogen ($N/NO_3$). *Nitrosomonas* sp. and *Nitrobactor* sp. are a natural occurrence. The influent is a semi-suspended mass of solids and bacteria. Using low turbulence aeration the matter is oxygenated and collides with other oxygenated matter and collectively coagulates and settles to the bottom as sludge. Fresh sewage fluids begin gaining oxygen thereby depleting BOD while the oxygenated solids coagulate and settle to the bottom. After multiple layers of fresh sludge settle the denitrifying bacteria begins the shift of oxic to anoxic cycle. There are three types of aeration pumps in theory: bubbler 47, FIG. 8, bubblre-slug, 48, FIG. 8, and the slug 49, FIG. 8. The MMS is adjustable to incorporate any one or all types due to the adjustability of pump inlet 10 FIG. 1 direction and the filter housing 8, FIG. 1 position. The fresh sludge will be re-entrained into the Target Zone strata 22 and sludge 23, FIG. 1 by large influent disturbances thereby re-oxygenating as it stirs into the mid strata. The sludge depletes most of the oxygen with multiple layers that cause the sludge to tighten together in a cake form. The absence of oxygen encourages *Pseudomonas* sp. and other denitrifying bacteria to biochemically attack the oxygen bound in nitrate molecules ($NO_3$). $NO_3$ is further reduced to $N_2$ and $O_2$. $N_2$ is released as a gas and the bacteria utilize the free $O_2$ therefore mitigating $H_2SO_4$. Larger influents disturb the sludge bottom thereby reactivating the oxic and anoxic cycle until the sludge becomes too old to stir and new sludge takes its place every two to three weeks. The MMS invention aerates the settling fresh sludge and the settled sludge as a bed of organic carbon thereby facilitating oxic and anoxic cohabitation in this chamber. The air source is adjusted to approximately thirty to forty percent of the $O_2$ production required for the tank contents to maintain aerobic.

BRIEF DESCRIPTION OF THE SEVERAL VIEWS OF THE DRAWINGS

FIG. 2 is a top view diagram of the bottom feed air pump with filter housing and buffer housing.

FIG. 3 is an elevation view diagram of a bottom feed air pump with filter housing and buffer housing.

FIG. 4 is a plan view diagram of a center feed air pump with a filter screen housing.

FIG. 5 is an elevation view diagram of a center feed air pump with a filter screen housing.

DETAILED DESCRIPTION OF THE INVENTION

Figure 1:
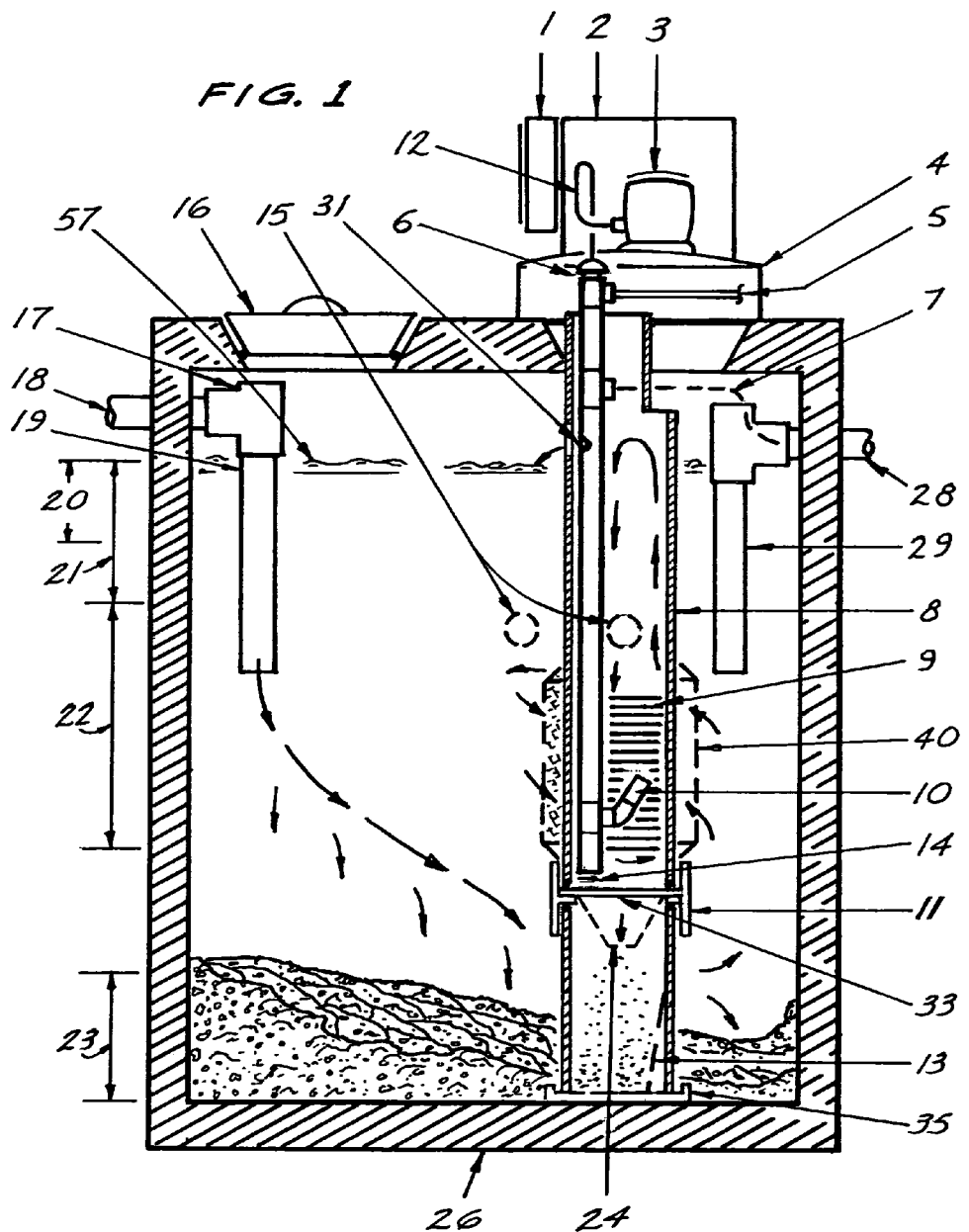
FIG. 1 is a general cross-sectional view of the invention in a raw sewage septic, pretreatment or pump tank.
Figure 7:
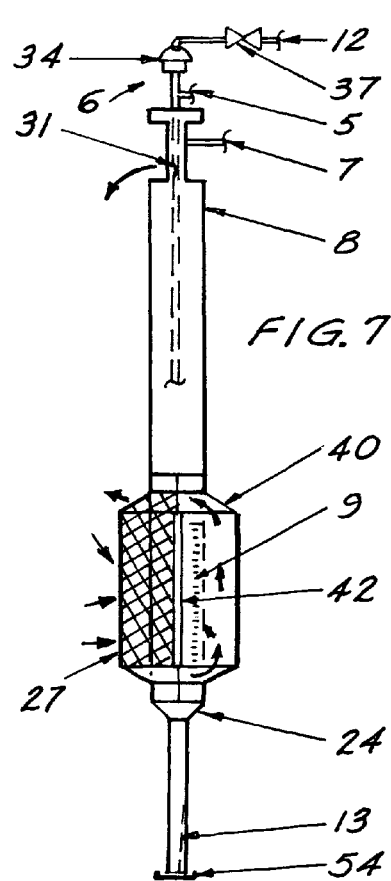
FIG. 7 is a center feed pump diagram with filter housing and buffer filter housing.

A mini-metering and biological balancer control station is a portable mini-dosing system comprised of and not limited to an adjustable airlift pump 6, FIGS. 1,4,5,7,8. with an alternate filter housing 8, FIGS. 1,3,7 mounted inside an approved wastewater or raw sewage tank 26, FIG. 1 together with an above ground blower 3, FIG. 1 and with blower cover 2, FIG. 1 an alternate control panel 1, FIG. 1. The unit operates without a control panel and can be installed in a three inch inspection port utilizing pump 6, FIGS. 4,5. Turning the blower 3, FIG. 1 on and off promotes a collapse of air lifted fluids to rush out the filter housing inlet 9, and filter housing reducer 24, FIGS. 1,3,7,8

The System is installed in the approved raw sewage tank 26, FIG. 1 or pump tank as disclosed in US PGPUB 2006/0226071. A modification to the tank's vertical inlet 19 FIG. 1 length and the tank's vertical outlet 29, FIG. 1 length may be required to provide the specified surge protection in Offset 21, FIG. 1 volume. Extensions provide additional space to prevent scum 57, FIG. 1 intrusion to other Host chambers therefore permitting the tank Offset 21, FIG. 1 dose cycle displacement. Unintentional excessive flows can bypass through the effluent conduit 28, FIG. 1 therefore preventing tank 26, FIG. 1 from overflowing. Due to Bypass capabilities Offset 21, FIG. 1 is configured greater than the design requirements.

Figure 8:
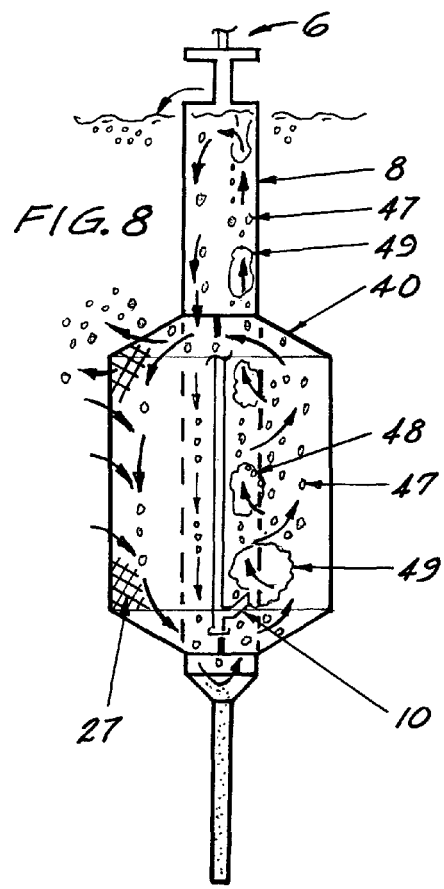
FIG. 8 is a flow diagram with filter housing and buffer filter housing.

The filter housing 8, FIG. 1 is positioned inside the raw sewage tank 26, FIG. 1 with the filter housing inlet 9, FIG. 1 positioned adjacent to tank vertical outlet 29, FIG. 1 and within the Target Zone 22, FIG. 1 between the scum strata 20 and the sludge zone 23, FIG. 1. An alternate second stage filter 40, FIGS. 2,3,7,8 is positioned around the filter housing 8, FIG. 1 first stage filter 39, FIGS. 2,3 due to high inrush turbulence. The larger second stage filter 40 FIGS. 2,3,7,8 filter screen inlet 27, FIGS. 2,3,7,8 now positioned with opposing fluid entry around filter housing 8, FIGS. 1,2,3,7,8 inlet 9 FIGS. 1,3,7. The two filters are positioned with opposite side entry thereby buffering the turbulence between the inside first stage filter 39, FIGS. 2,3,7 and the outside second stage filter 40, FIGS. 2,3,7,8. Gasket 42, FIG. 2 provides flow direction inside the second stage filter 40, and filter screen 27 FIGS. 2,3,7,8. The fluids entering the filter screen 27 FIGS. 7,8 are restricted from circulating around the inner housing 8, FIGS. 2,7,8 circulating currents FIG. 8. An alternate filter housing, not shown, performs the same task and position as filter housing, 40, FIGS. 2,3,7,8 and is the same height as the filter housing 8, FIG. 1. This larger diameter filter housing replaces second stage filter 40, FIGS. 2,3,7,8. Fluids enter all filters horizontally FIG. 1. The airlift pump 6, FIGS. 1,4,7,8 is at maximum gallons per minute capacity at full tank capacity. The airlift pump 6, FIG. 1 is at minimum or zero capacity at the bottom of the Offset 21, FIG. 1. The circulation of aerated fluids in the filter housing 8, FIGS. 1,7,8 increase as the volume of the Offset 21, FIG. 1 decreases due to a natural hydraulic occurrence and the horizontal position of pump inlet 10, FIGS. 1,7,8. The circulating liquids are directed down due to gasket 42, FIG. 7. An alternative reducer 24 FIGS. 1,3,7,8 directs solids to the bottom of the filter housing 8, FIGS. 1,3,7,8 without the use of alternate floor 33, FIG. 1.

The pumping cycle is controlled by position and direction. The center feed airlift pump inlet 10, FIGS. 1,4,5,8 is positioned inside the filter housing inlet 9, FIG. 1, with adjustable direction due to pump inlet 10, FIG. 1 position. The directional backwash aeration rises intermittently upward and expands in all directions, as a natural occurrence, to lift the clogging filter particles up and off the filter housing inlet 9, FIGS. 1,7,8. A filter apparatus can be tilted slightly, not shown, for turbulent or high BOD service to provide more oxygen contact to the filter or install an angular filter, not shown. Additional air, not shown, from the blower 3, FIG. 1 serves as supplemental backwash to any filter by routing a small flexible tube, not shown, from the blower 3, FIG. 1 to the filter. The high BOD filter not shown, employs angular direction for more oxygen to the filter surface that produces more vibration and rising force directed to the filter. The intermittent aeration increases as the volume decreases. The decrease in volume changes the head pressure and the suction pressure; a natural law of physics, allowing the air pressure; a constant, to increase air belching as the volume decreases. The backwash to the filter housing inlet 9, FIGS. 1,3,7, increases durations at higher intermittent rates, due to loss of suction head pressure, after the first segment of pumping with a full tank. The filter cleaning cycle increases as Offset volume decreases due to the frequent intermittent aeration at low suction pressure. During this time cycle the surrounding fluids in the source pool have been aerated for the longest duration and are biologically and biochemically active before, during and after a new Offset 21, FIG. 1 cycle begins.

The pump inlet 10, FIGS. 1,2,3,4,5,8 directs the air slug 49, FIG. 8 to the immediate proximity of the filter. The aerated backwash air expands a portion of the rising air bubbles 47, FIG. 8 to travel through the filter housing inlet 9, FIGS. 1,3,7. This backward flow entrains oxygenated fluids into the source pool proportional to the vertical positioning of the filter housing inlet 9, FIG. 1 or alternative second stage filter 40, FIGS. 1,2,3,7,8 inlet screen 27, FIGS. 2,3,4,7,8 or alternative filters, not shown. The remaining portion of slug 49, FIG. 8 air together with bubbles 47, and bubble-slug 48, FIG. 8 mixes oxygenated fluids inside the filter housing 8, FIG. 8 with highly oxygenated circulating fluid currents. Additional backwash slug 49 air is generated at any time by the cycling on and off of the blower 3, FIG. 1 due to the recoil action of rising then falling fluids in the pump 6, FIGS. 1,4,5,7,8.

The rebounding fluids known as hammerhead, a natural occurrence by the configuration of pump 6, FIGS. 1,3,5,7,8 with cap 14 FIG. 5. Pump 25, FIGS. 2,5 will not naturally promote the same quantity of hammerhead without converting the top elbow to a long radius tee 50, FIG. 3 Pump 6, FIGS. 7,8 circulates and mixes oxygenated fluids in direct contact with organisms in the upper two-thirds of the raw sewage tank 26, FIG. 1 promoting the oxic cycle. The oxic cycle is positioned above the sludge blanket 23, FIG. 1 and uses the floating solids and the unsettled solids as its carbon source. The turbulent sludge enters the oxic strata and retains the available oxygen. The sludge settles and exhaust the oxygen content to near depletion. The cycle continues until the sludge is old and loses its ability to produce poisonous gases. Oxic and Anoxic wastewater treatment cycles prohibit the natural occurring $H_2SO_4$ gases.

The fluids escaping the filter housing inlet 9, FIG. 1 reduce the BOD5 levels in the source pool together with oxygenated fluids lifting and mixing in the airlift pump 6 FIG. 1, contribute activated effluent that reduces the remote Host treatment BOD5 levels. The percentage of BOD5 reduction is proportional to the blower 3, FIG. 1 cubic feet per minute, the airlift pump 6, FIG. 1 gallons per minute and rate of recirculating activated fluids FIG. 8. All parameters can be adjusted for specific task designs. The controlled flow of oxygen to the source pool maintains the biological balance.

Biological balance of nutrient to organism ratio requires the influent to receive 5 to 30 percent of the aerobic Host normal daily aeration capacity. Small continuous oxygen supply maintains aerobic and facultative conditions in the fluids of raw sewage tank 26, FIG. 1 and the settling sludge, not shown.

Alternate control panel 1, FIG. 1 is fastened to the blower housing 2, FIG. 1 and riser 4, FIG. 1. Blower 3, FIG. 1 conduit 12, FIG. 1 and optional control apparatuses, not shown, are connected to the center feed airlift pump 6, FIGS. 1,4,5 or optional pump 25, FIGS. 2,3 slip-lock cap with gland 34, FIGS. 4,5. Vertical adjustments to the air supply 12, FIGS. 1,2,3,4,5,7 changes belching; a natural occurrence, and dosing volume. Bottom feed airlift pump 25 FIG. 3 with long radius elbow 55, FIG. 3 produces greater gallons per minute rates. Belching is the expansion of air that intermittently escapes the pump inlet 10 FIGS. 1,2,3,4,5,8 by the hammerhead effect of the recoil action of the airlift pump 6, FIGS. 1,4,5,8 assembly and airlift pump 25 FIGS. 2,3 with alternate long sweep tee 50, FIG. 3. The unique extension on top of airlift pump 6, FIGS. 1,3,4,5 head extends the top higher than the discharge 5, FIG. 1 or alternate discharge 7, FIGS. 1,4,5,7 causing an adjustable hammerhead or recoil effect.

Center feed airlift pump 6, FIGS. 1,4,5,7 discharge conduit 5, FIGS. 1,4,5,7 Connect fluidly to adjacent treatment process, including aerobic treatment tank, not shown, in aerobic systems.

Minimal changes to head reduction and air supply positioning changes the Offset 21, FIG. 1 thereby provides adjustment to the dosing cycle volume Offset 21 FIG. 1 and surge protection. Center feed airlift pump 6, FIGS. 1,4,5,7 or bottom feed airlift pump 25, FIGS. 2,3 are sized for minimal or no field modifications to the preferred embodiment.

The above ground blower 3, FIG. 1 is sized for all residential services. Gallons per day field altered with adjustments, control panel 1, FIG. 1 or switches, not shown, or floats 15, FIG. 1 or alternate air conduit, not shown. Intermittent $O_2$ maintains conditions that thereby eliminate the pungent septic odors associated in this tank 26, FIG. 1.

A miniature blower 3, FIG. 1 produces approximately 1.5 LB of $O_2$/LB of BOD applied/day or more. The blower 3, FIG. 1 using 30 watts and provides approximately 0.5 LB OR/LB of BOD or more applied in the pump outlet 5,7, FIGS. 1,3,5,7 Commercial daily flows require little or no changes due to the flexibility of above ground volume adjustment and alternate control panel 1, FIG. 1 and permissive devices, not shown. An upsized miniature blower, not shown, or pump 25 FIGS. 2,3 increases the output gallons per minute.

An adjustable miniature dosing cycle is preset at the factory with incremental visual illustrated marks on the air supply conduit 12 FIG. 1. The illustrated marks are a reference to select liquid minimum and liquid maximum levels in raw sewage tank 26 FIG. 1. The incremental marks represent a relative volume in gallons proportional to the tank 26, FIG. 1 volume in gallons per inch. The adjustable surge protection volume, Offset 21, FIG. 1, is set by positioning the airlift pump 6, FIG. 1 or air supply conduit 12, FIG. 1 The Offset 21 FIG. 1 volume displaced permits unsettled solids to settle before the airlift pump 6, FIG. 1 begins pumping at full gallons per minute. Control panel 1, FIG. 1, switches or remote controls, not shown, delay pumping during long turbulent influent cycles thereby promoting the end of the settling process prior to the start of the Offset 21, FIG. 1 cycle.

Figure 6:
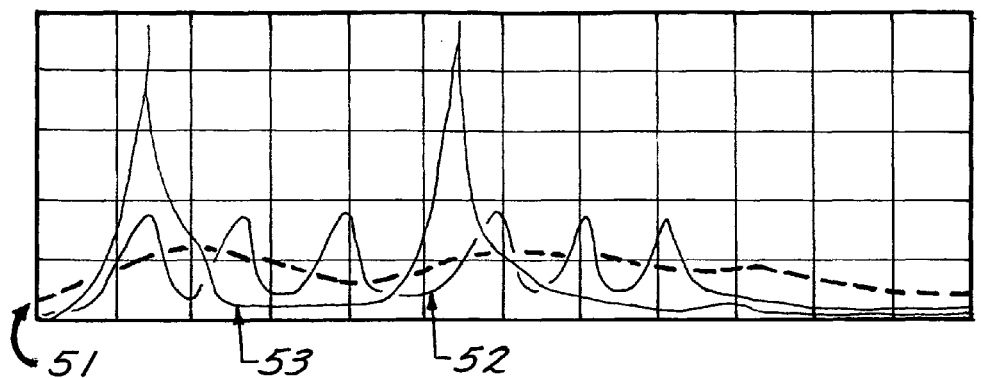
FIG. 6 is a comparison graph of gpm and microbial population action.

The above ground dosing feed rate is controlled by: adjustable air pressure, not shown, adjustable head pressure, adjustable suction pressure, adjustable pump 6, FIG. 1 depth, or alternate pump 25, FIG. 3 and an adjustable return activated sewage aperture 31, FIGS. 1,5,7 or orifice 45, FIG. 3 or valve, not shown. Dosing cycle duration is controlled by: time delay, pump inlet 10 FIG. 1 depth, suction and head pressure and return activated sewage rate aperture 31, FIGS. 1,5,7 or orifice 45, FIG. 3 or valve, not shown. Dosing cycle duration determines microbial action by natural occurrence illustrated in Mini-Metering Station graph 51 FIG. 6. Centrifugal pumps 52,52 FIG. 6 demonstrate feast and famine cycles and multistart failure.

The Mini Metering Station controls the BOD strength of the sewage by proportional growth of microorganisms in long small dosages to provide balance through the complete process. The activated effluent 5,7, FIG. 1, together with extended pump cycle durations, prevent a unbalanced feast and famine feed cycle.

Aeration is set to reduce BOD in the source pool and circulate $O_2$ in the filter housing 8, FIG. 8. The System automatically controls the increasing sewage influent by automatically increasing the pump 6 FIG. 1 output proportionally and decrease the BOD in the remote Host system thereby furthering the total system balance thereby eliminating the feast and famine cycle of conventional centrifugal pumping systems.

Dosing output at the lower end of Offset 21, FIG. 1 is ounces per minute and increases output proportionally as the level rises. Dosing cycle maximum liquid volume output is the Offset 21, FIG. 1 equivalent volume. Floor 33, FIG. 1 is alternatively positioned as required thereby maintaining flow control.

Offset 21, FIG. 1 is the difference in the fluid level at the beginning of the dosing cycle and the level at the end of the dosing cycle. Extended low flow gallons per minute promote and maintains the nutrient to microbial ratio to balance the biological and biochemical Host system. Control panel 1, FIG. 1 or switches, not shown, facilitate specific duration requirements. The pneumatic and hydraulic Mini-Metering System functions do not require a control panel to interface with remote controls, not shown.

The aperture 31, FIGS. 1,5,7 or optional apparatuses, not shown, or orifice 45, FIG. 3 in the airlift pump 6, FIGS. 1,5,7 provides recirculation of oxygenated and activated fluid movement that sprays the top of the scum strata 20, FIG. 1. Fluids squirting on top of the scum 57, FIG. 1 promotes scum to collapse into an oily thin layer and re-entrain into the scum strata 20. FIG. 1 in contact with the freshly oxygenated liquids thereby furthering the degradation of the scum.

The aperture 31, FIGS. 1,5,7, or orifice 45, FIG. 3 or apparatus adaptation, not shown, is proportionally positioned below the pump slip-lock cap with gland 34, FIGS. 1,5,7 and the liquid source pool level. Field modifying the aperture diameter enlargement will increase the RAS rate therefore mitigating additional scum 57, FIG. 1, and increase free oxygen and dissolved oxygen into the source pool. A control means, not shown, attached over the aperture 31, FIG. 1 serves as an adjustable pump discharge rate controller. The adjustable air pressure, the adjustable head pressure, the adjustable air positioning, the adjustable filter cleaning, together or in part provide adjustable aerated feed rates that provides surge protection and protects down-stream processes and maintain a balanced microorganism to food ratio together to enhance the biological and biochemical balancing average.

Technical and Operational Information

The Mini-Metering System dosing and biological balancer system herein referred to as the MMS. The return activated sewage system herein referred to as RAS. The MMS functions with or without the assistance of a Host system. The Host system power feeder disconnect, servicing the Mini-Metering Station, must be in the off position during installation. Test the supply power voltage and ampacity. Using Host blower to drive the Mini-Metering Station requires checking for permissive start switches.

Check the voltage level to the blower motor. Alternate control panel, separate from the Host, requires testing procedure for the local panel. Test all switches or other alternative permissive start devices. All Host and or local control panel switches should be in the on position. Check the RAS and the CIP action. Set the Offset and the dosing cycle parameters.

Refer to the Blower Placard for offset information. Twist the slip-lock cap with gland on top of the center feed airlift pump in a counter clockwise motion until the air feed header moves with little force. Adjust the new corrected Offset depth by pushing the air feed header one graduated mark up or down inside the pump relative to the starting point marked with respect to the beginning reference. The pump will maintain RAS and CIP but will not pump effluent until additional water is added to the source pool.

The Placard indicates 100 gallon Offset, therefore, divide 100 by 10.4 equals 9.6 inches of tank depth. Use a 12 inch Offset. Ten inches of air void plus twelve inches of Offset equals a depth of twenty two inches of no liquid at the end of pump cycle.

New installations require filling the tank with clean water within twenty two inches of air space and install the Mini-Metering System. Engage the mini-air blower power on switch at the control panel or on the blower cover. The airlift pump should start the CIP and RAS mode without a dosing discharge. CIP increase occurs naturally at the time the pump head pressure drops too low to maintain flow to the discharge line. This is a natural occurrence due to head pressure and air supply positioning. During dosing cycles the filter backwash is intermittent.

Pump starts discharging when set at or below the assigned Offset depth. Adjust the center feed air supply header until it stops discharging while it continues RAS and CIP action or adjust pump inlet elevation using the pump mounting apparatuses.

Loss of pump suction pressure increases the filter backwashing and decreases RAS. The RAS continues due to the aperture position below the airlift pump effluent. RAS always maintain sufficient head pressure to operate provided blower pressure is normal. Clean out the RAS port or optional control apparatuses.

There are no adjustments required if flow capacity increases from 300 gallons per day to 360 gallons per day. The MMS will inherently adjust to compensate for the additional load. If the owner is using 60 gallons extra every day then make an adjustment to the airlift pump's vertical position.

At maximum tank liquid capacity the pump is factory set to produce approximately three gallons per minute. As liquid volume decreases the gallons per minute output will inherently decrease. One sixteenth inch of Tank fluid equals 4.33 cubic inches per inch of tank fluid level in gallons per minute pumping capacity due to hydraulics. MMS retains bypass capabilities for liquids in an emergency to circumvent by gravity through the vertical outlet conduit thereby preventing overflowing into the environment. Adjust the Offset 21, FIG. 1 to accommodate new usage cycle requirements once the Mini-Metering System has been in operation.

The bottom feed airlift pump standard configuration performs above 5 gallons per minute compared to the center feed pump at 3 gallons per minute. Both of these pumps can be resized or reconfigured to obtain any gallons per minute output as required. Fill the tank or drain the tank to the desired bottom level of the Offset. The bottom feed pump is set in place as described in the center feed pump instructions with power turned off.

Tighten the pump mounting apparatuses, not shown, after the selected discharge aligns with the desired discharge conduit. The air supply line requires a loop in the line in order to adjust the final pump inlet depth.

Commercial and residential units receive less sewage input during the night hours. The eight hour late dosing cycle promotes: low volume dosing, shutdown period for anaerobic activity and long durations of RAS and CIP. Balance the MMS source pool with repetitive blower starting and stopping to the blower and continuous aeration after the last dosing cycle.

BOD5 is reduced in the source pool by RAS and CIP together further the aeration with mixing in the filter housing and blower hammerhead starting and stopping. The oxygen rich activated source pool effluent enters the Host process in low dose freshly aerated quantities that maintains settling and the biological balance.

Filtration considerations: Maintenance; frequency and location,
Gallons per minute; normal or high,
Turbulence; frequency and duration,
Type; inline, screen or shielding,
Tank size; length and capacity.
Aeration causes the fluids to rise inside the filter housing and inside the pump. Any power loss causes the suspended liquids to collapse back to normal level sending a downward force of fluids backwards through the filters. Jog the blower power on and off each hour or more as necessary. Night time repetitive starting and stoppings accelerates the oxygenated fluids out into all regions of the source pool. Pressure switches, floats and timers can be selected to jog the power on and off at any portion of the dosing cycle thereby lengthening the dosing cycle.

High gallons per minute rates in the raw sewage tanks may require the standard filter housing and the buffer filter due to the potential of high turbulence. The pump inlet is positioned next to the standard housing filter or angular filter to direct full capacity of backwash rising next to the housing inlet for maximum cleaning. Filter housing clogging requires an adjustment by vertically tilting the housing and maintain the slanted position. One inch off of vertical position promotes rising expanding air and fluids to remain in contact with the filter for longer durations. Select a falter with an integral air guide, not shown, or factory angular filter or field alter the existing filter on a vertical slant.

Turbulence is controlled by: tank volume; separation between inlet and outlet, baffles, additional tank and two stage filters. Filter selection before or after the system is installed will assist in the prevention of contamination and fatigue of components. High turbulent inrush systems require two filter housing. The second stage, inside, vertical filter housing is smaller than the first stage, outside, vertical filter housing. A smaller diameter second stage housing is installed inside the larger first stage filter housing. Position the outside filter housing inlet; now a buffer, 90 degrees with respect to the inside filter inlets. The airlift pump is equipped with an unused air supply tap located on the blower outlet. Route a plastic tube to the filter required for high turbulent inrush service. Adjust the air valve on the blower outlet to add.

Materials for the Mini-Metering System airlift pumps are constructed of common plastic pipe and fittings. All other material must be approved by The Mini-Metering System Manufacturing Company.

Volt AC Air blower output ranges from 0.7 psi at 20 LPM at 30 watts and 1.0 psi at 30 LPM at 40 watts, 120 VAC. Line fuses to be sized according to local regulations. Greater PSI output variations must be approved by the Mini-Metering Station Manufacturing Company.

The invention claimed is:

1. A system for biological treatment of water and wastewater, and filtering wastewater effluent, comprising:
   (a) a portable, adjustable airlift dosing pump and filtration mechanism for aerating and dosing oxygenated mixed liquors, the airlift dosing pump installed within a raw sewage pretreatment tank, the airlift dosing pump comprising:
      (i) a vertical conduit having an airlift dosing pump inlet near a bottom end of the vertical conduit and an airlift dosing pump outlet near a top of the vertical conduit fluidly connected to an effluent conduit of the raw sewage pretreatment tank within a host sewage treatment pump tank,
      (ii) the vertical conduit further having an aperture mechanism positioned in the vertical conduit below the outlet of the airlift dosing pump, and positioned proportional to the airlift dosing pump outlet and a liquid level in the raw sewage pretreatment tank, and
      (iii) a vertical housing into which the vertical conduit is positioned, the raw sewage pretreatment tank configured to accept a raw sewage pretreatment tank influent and produce a raw sewage pretreatment tank effluent from a source pool containing liquids and solids, wherein the liquids and solids are distributed within the raw sewage pretreatment tank into an upper scum region, a lower sludge region, and a settling liquid region defining the source pool located between the upper scum region and the lower sludge region;
   (b) the airlift dosing pump further comprising a first stage filter housing positioned around a second stage filter housing, the second stage filter housing being an extension of the airlift dosing pump vertical housing, the first and second filter housings positioned in the settling liquid region, the first stage filter housing and the second stage filter housing defining there between a settling chamber, and the second stage filter housing defining a mixing chamber internal thereto;
   (c) the second stage filter housing positioned inside the first stage filter housing with opposing filter inlets, thereby removing the solids during movement from a first stage filter housing inlet to an opposite side second stage filter housing inlet, and positioned in the settling liquid region;
   (d) the airlift dosing pump further comprising a micro-adjustable, retractable air supply conduit fluidly connected to the vertical conduit of the airlift dosing pump near a bottom of the vertical conduit, and positioned in the center of the second stage filter housing and responsive to cooperating intermittent cyclic dosing means;
   (e) a directional pump fluidly connected to the airlift dosing pump's vertical conduit and positioned in a lower section of the airlift dosing pump's vertical conduit, for directing a portion of filter backwash semi-turbulent air bubbles inside the mixing chamber, at least a portion of the semi-turbulent air bubbles lifting and removing solid matter from the second stage filter housing into a lifting chamber thereby increasing oxygen levels in the pump tank's influent, the pump tank's effluent, and the source pool;

(f) means for jogging power to the directional pump and reversing the flow through the second stage filter housing;

(g) an above ground combination system cover and mini-blower housing means;

(h) means for adjusting head pressure above a liquid level in the raw sewage pretreatment tank by multiple dosing of air to the micro-adjustable, retractable air supply conduit;

(i) an above ground adjustable liquid surge control means responsible to multiple liquid levels in the raw sewage pretreatment tank including a selected minimum and a selected maximum level;

(j) a micro-adjustable side feed air supply conduit fluidly connected to the vertical conduit of the airlift dosing pump; and (k) an above ground adjustable biological dosing feed rate control mechanism configured to control air flow to the micro-adjustable, retractable air supply conduit and cooperating intermittent cyclic dosing means, and thereby supply oxygenated nutrients to the raw sewage pretreatment tank.

2. The system defined in claim 1 wherein the control mechanism is operable without a control panel.

3. The system defined in claim 1 comprising a tank inspection port accessible on a roof of the raw sewage pretreatment tank and through which the airlift dosing pump is inserted.

4. The system defined in claim 1 wherein the intermittent cyclic dosing means comprises a volume adjustment means located above ground.

5. A method for biological treatment of water and wastewater using the system of claim 1 comprising:

(a) increasing or decreasing an intermittent automatic backwash aeration cycle proportional to raw sewage pretreatment tank head and suction pressure;

(b) increasing or decreasing intermittent aeration in the airlift dosing pump mixing chamber proportional to raw sewage pretreatment tank head and suction pressure;

(c) recirculating at least a portion of activated sewage to the source pool through the aperture mechanism, returning at least a portion of activated sewage to the scum region to mitigate scum formation in the scum region by lightly spraying activated sewage onto a top surface of the scum region and thereby re-entraining the scum into the activated sewage in the source pool for further reduction of BOD, increasing dissolved and free oxygen levels in the source pool, airlift dosing pump lifting chamber, airlift dosing pump mixing chamber, airlift dosing pump settling chamber, airlift dosing pump discharge effluent and return activated sewage discharge aperture, thereby reducing BOD5 requirements in the raw sewage pretreatment tank and the airlift dosing pump lifting chamber, airlift dosing pump mixing chamber, and airlift dosing pump settling chamber, and thereby (1) mitigating $H_2S$ gases and the requirement to supply fresh air ventilation fans in access openings of the raw sewage pretreatment tank by intermittent cycles of aerobic mixing of activated mixed liquors;

(2) biologically balancing the source pool by continuous mixing, keeping the water or wastewater in contact with microorganisms and air in the raw sewage pretreatment tank to maintain aerobic and facultative pretreatment;

(3) maintaining oxic and anoxic conditions in the raw sewage pretreatment tank due to an upper oxic strata in the upper scum region and a lower anoxic strata in the lower sludge region with alternating aeration durations; and (4) controlling biological balance of the raw sewage pretreatment tank by continuous aerobic treatment of the source pool, together with treatment of the first and second stage filter housings.

6. The method defined in claim 5 further comprising mitigation of a feast and famine biological cycle in the host sewage treatment pump tank by long extended dosing cycles by the airlift dosing pump.

7. The method defined in claim 5 further comprising mixing the air and the water or wastewater in the settling chamber of the first stage filter housing.

8. The method defined in claim 5 further comprising adjusting airlift dosing pump back pressure recoil that intermittently reverses air and fluid flow for backwashing.

9. The method defined in claim 5 further comprising removal of pungent odors due to nitrification and denitrification that mitigates odorous gases.

10. The method defined in claim 5 further comprising centering the retractable air supply conduit of the airlift dosing pump through the airlift dosing pump's vertical conduit.

11. The method defined in claim 5 further comprising adjusting one or more flow rate apparatus accessible above the liquid level of the raw sewage pretreatment tank.

12. The method defined in claim 5 further comprising micro-dosing activated cycles, thus providing microbial surge protection.

13. The method defined in claim 5 further comprising employing offset surge protection volume displacement, thereby preventing large quantities of settable solids from bypassing the settling process.

* * * * *